United States Patent [19]

Himmelblau

[11] Patent Number: 5,115,084
[45] Date of Patent: May 19, 1992

[54] METHOD FOR CONTROLLING OIL RESERVOIR PERMEABILITY USING BIOMASS OIL

[75] Inventor: D. Andrew Himmelblau, Lexington, Mass.

[73] Assignee: Biocarbons Corporation, Woburn, Mass.

[21] Appl. No.: 647,588

[22] Filed: Jan. 29, 1991

Related U.S. Application Data

[63] Continuation-in-part of Ser. No. 382,232, Jul. 19, 1989, Pat. No. 5,034,498.

[51] Int. Cl.⁵ .............................................. C08G 8/20
[52] U.S. Cl. ..................................... 528/230; 528/1; 524/13; 524/72; 524/73; 524/74; 524/735; 527/103; 527/105; 568/727; 568/762; 166/270
[58] Field of Search ........... 528/230, 1; 524/13, 524/72, 73, 74, 735; 527/103, 105; 568/727, 762; 166/270

[56] References Cited

U.S. PATENT DOCUMENTS

| | | | |
|---|---|---|---|
| 3,754,076 | 8/1973 | Cutler | 423/345 |
| 4,233,465 | 11/1980 | Gallivan et al. | 568/727 |
| 4,344,373 | 8/1982 | Ishii et al. | 110/347 |
| 4,433,126 | 2/1984 | Hsu et al. | 527/105 |
| 4,508,886 | 4/1985 | Russell et al. | 528/1 |
| 4,568,362 | 2/1986 | Deglise et al. | 48/209 |
| 4,776,398 | 10/1988 | Chu et al. | 166/274 |
| 4,787,451 | 11/1988 | Mitchell | 166/270 |
| 4,903,766 | 2/1990 | Shu | 166/270 |
| 4,926,943 | 5/1990 | Hoskin | 166/270 |
| 4,940,091 | 7/1990 | Shu et al. | 166/270 |
| 4,941,533 | 7/1990 | Buller et al. | 166/252 |

Primary Examiner—John Kight, III
Assistant Examiner—Sam A. Acquah
Attorney, Agent, or Firm—Iandiorio & Dingman

[57] ABSTRACT

A method for controlling the permeability of a petroleum-bearing subterranean formation including the steps of producing from biomass, a water-insoluble viscous biomass oil, and injecting the biomass oil into the petroleum bearing formation to decrease the permeability of at least some of the formation for altering flow paths through the formation to increase petroleum yield.

28 Claims, 5 Drawing Sheets

Pressure (O) $>P_1>P_2>P_3>P_4>P_5$
(During Flow)

Flow$_1$ $>F_2>F_3$

METHOD FOR CONTROLLING OIL RESERVOIR PERMEABILITY USING BIOMASS OIL

RELATED APPLICATIONS

This application is a continuation-in-part of application Ser. No. 07/382,232, filed on Jul. 19, 1989, now U.S. Pat. No. 5,034,498.

FIELD OF INVENTION

This invention relates to a method for controlling the permeability of subterranean oil reservoirs using viscous oil cross-linkable in situ and made from biomass feedstock.

BACKGROUND OF INVENTION

Currently, in the United States, most petroleum is produced by the natural drive of subterranean gas or water, or by water or steam flooding using one or more injection wells. When the petroleum is produced by water-drive, the petroleum is typically coming from relatively low permeability zones with pore sizes on the order of 1-10 microns, while the water is pouring through the larger channels that have already been swept of oil; the ratio of the volume of water to that of oil drawn from the production well is commonly from 20 to 100 or more. The electricity costs for pumping up such a large volume of water along with the oil can make the cost of oil recovery prohibitive.

There have been numerous proposals aimed at overcoming this problem by blocking the larger subterranean channels to reduce the flow of water that is unaccompanied by oil. These techniques, however, typically employ conventional petroleum-derived polymers which are injected in a very dilute water solution to at least partially block the larger flow channels. Examples of such polymers are described in U.S. Pat. No. 4,776,398, issued to Chu et al. on Oct. 11, 1988; U.S. Pat. No. 4,926,943, issued on May 22, 1990, to Hoskin; U.S. Pat. No. 4,940,091, issued on Jul. 10, 1990, to Chu et al.; U.S. Pat. No. 4,787,451, issued on Nov. 29, 1988, to Mitchell; U.S. Pat. No. 4,941,533, issued on Jul. 17, 1990, to Buller et al.; and U.S. Pat. No. 4,903,766, issued on Feb. 27, 1990, to Chu. These patents describe the use of large petroleum-derived and microbe-derived polymer molecules with molecular weights in the millions. The polymers are typically very expensive to produce and so are used in very dilute aqueous solutions.

There are a number of additional problems which are created by use of these petroleum-based, large polymer molecules. For one, the molecules tend to shear on injection, thereby losing their effectiveness. Further, the divalent salts which are commonly present in the subterranean petroleum-bearing formations tend to cause many polymer molecules to curl, thereby decreasing their size and so the effectiveness of the polymer. Still further, the polymers are subject to chemical, thermal and biological degradation, for example oxidation, in situ, decreasing their effectiveness. Also, an injection water source of suitable purity for the polymer may not be available in the field, or the available water may require extensive treatment. There is also the consideration that if these polymers are back-produced they will contaminate the petroleum. Accordingly, the water-soluble polymer injection techniques had not been widely accepted as effective, economical means of controlling the permeability of petroleum-bearing subterranean formations.

SUMMARY OF INVENTION

It is therefore an object of this invention to provide an economical method for controlling oil reservoir permeability which reduces the amount of water produced.

It is a further object of this invention to provide such a method which does not require the use of a dilute polymer-water solution.

It is a further object of this invention to provide such a method which employs a permeability controlling agent which is made from renewable resources and compatible with petroleum.

It is a further object of this invention to provide such a method which employs a permeability controlling agent made from biomass material.

It is a further object of this invention to provide such a method which employs a permeability controlling agent which has relatively small molecules.

It is a further object of this invention to provide such a method which employs a permeability controlling agent which will effectively plug previously-swept zones whether the pore size is relatively large or relatively small.

It is a further object of this invention to provide such a method which employs a permeability controlling agent which will not mechanically degrade upon injection.

It is a further object of this invention to provide such a method which employs a permeability controlling agent which is not subject to biological, chemical or thermal degradation due to untreated reservoir conditions.

It is a further object of this invention to provide such a method which employs a permeability controlling agent which may polymerize in situ under natural conditions.

It is a further object of this invention to provide such a method which employs a permeability controlling agent which may be polymerized in situ with an inexpensive polymerizing agent.

It is a further object of this invention to provide such a method which employs a permeability controlling agent which, when polymerized, is soluble to allow blocked zones to be re-opened, if desired.

It is a further object of this invention to provide such a method which employs a permeability controlling agent which does not curl when exposed to subterranean salts.

It is a further object of this invention to provide such a method which employs a permeability controlling agent which will not contaminate petroleum.

It is a further object of this invention to provide such a method which is useful in both water and steam-flooded wells.

This invention results from the realization that the permeability of subterranean oil-bearing formations being swept with water or steam may be inexpensively and effectively controlled with a viscous, polymerizable biomass oil produced from any lignin-bearing biomass material which may be polymerized in situ with an inexpensive, soluble-salt basic solution to effectively tailor the permeability control, and in which the polymerized biomass oil may be removed to allow reconfiguration of the reservoir.

This invention features a method for controlling the permeability of petroleum-bearing subterranean formations, including producing from biomass a water-insoluble viscous biomass oil and injecting the oil into the petroleum bearing formation to decrease the permeability of at least some of the formation for altering the flow paths through the formation to increase petroleum yield from the formation. The biomass oil may be produced by partially oxidizing biomass to produce an alkyl-phenolic and aldehyde rich oil. The partial oxidation may take place in a fluidized-bed reactor employing less than stoichiometric oxygen-containing gas, for example 20% air, to burn some of the material to produce at least some of the heat for the thermal decomposition of the biomass. Alternatively, the biomass oil may be produced by pure pyrolysis and/or liquefaction either with or without further oil-fraction separation to produce a desired oil fraction with sufficient phenolics and aldehydes to provide a polymerizable, cross-linkable, viscous oil which may be further polymerized in situ via naturally occurring salts, or with injection of a polymerizing agent to control subterranean formation permeability as desired.

Preferably, the biomass oil is filtered before injection to remove at least some particulates such as char and ash to prevent particulate blocking of the subterranean formation.

The biomass oil, after injection, may be further polymerized by introducing into the formation after the biomass oil, through either the injection well(s) or the production well(s), a biomass oil polymerizing agent, which may be a monovalent or divalent metal hydroxide, for example sodium or calcium hydroxide. The injected polymerized oil may be at least partially removed at a later time by water or a basic solution, in which the polymerized oil is soluble.

The biomass oil may be produced, and/or altered after production, with the desired pH, viscosity and/or density for a specific subterranean formation. The pH may be tailored using a soluble-salt, basic substance such as sodium hydroxide. The viscosity may be adjusted by partially polymerizing the oil by increasing the pH and/or heating the oil, or by thinning the oil with a thinning substance such as a ketone an acetate or water. Since the oil is not soluble in water, the water may be added using shear, either with or without a surfactant.

DISCLOSURE OF PREFERRED EMBODIMENT

Other objects, features, and advantages will occur from the following description of preferred embodiments and the accompanying drawings, in which:

FIGS. 5A, 5B, 5C, 5D and 5E illustrate permeability control according to this invention using an injection well as the point of introduction.

The biomass oil used as a blocking agent in this invention may be derived from thermal degradation of biomass material, including pyrolysis, liquefaction, or partial oxidation. The entire or a partial fraction of biomass oil so produced may be used. It is important simply that the biomass oil have a higher viscosity than water at reservoir temperatures so that it is less mobile than water, and that the particulate content be low so that the maximum particle size is compatible with the reservoir pore structure. Preferably, the biomass oil contains phenolics and aldehydes so that it may be cross-linked in situ catalytically with alkali salts.

In making oil from biomass, the reaction temperature, time, and reactor design are critical factors in determining the chemical makeup of the oil. At reaction temperatures of up to approximately 480° C., the oil includes primarily mixed oxygenates and phenolic ethers, which have few reactive sites. As a result, although oil yield is greater at these low temperatures, the biomass oil is not well suited for polymerization and cross-linking. Above approximately 760° C., the oil yield is extremely low. In addition, there are few oxygenated components; the major constituents would be polyaromatic hydrocarbons, which could not be polymerized to form a more viscous oil. Reaction time also affects the final product; the reaction time should be long enough to decompose the biomass to form gas, vaporized oil and char. It is important to establish a reaction temperature and time which provide a large oil fraction of alkyl phenolics, which have the available sites for polymerization and cross-linking. With a dried wood-chip feedstock having a moisture content of approximately 15–20%, a temperature of from 480° to 760° C. and a reaction time of 0.5 to 2.5 seconds will provide a reasonable oil volume having enough alkyl phenolic and aldehyde content to ensure polymerization on addition of the basic substance. At a fixed temperature, excessive reaction time will allow secondary reaction of the vaporized oil.

Figure 1:
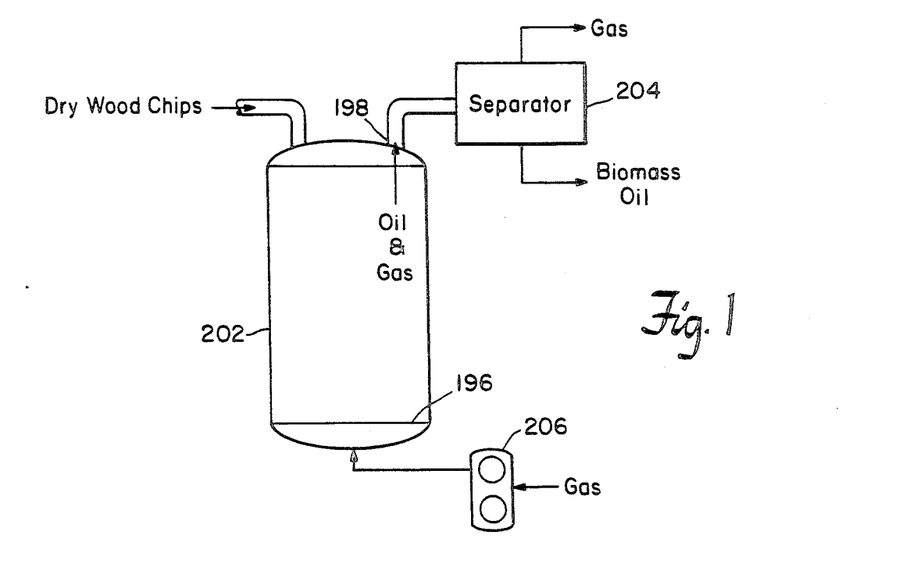
FIG. 1 is a schematic diagram of a fluidized-bed gasifier and gas/oil separator for producing an acidic biomass oil for use in the method of this invention.

One apparatus for producing the biomass oil used in the invention is shown in FIG. 1. Fluidized-bed gasifier 202 is fed from the top with dried wood chips, and counter-current fluidizing gas from the bottom through blower 206. Any gas having less than stoichiometric oxygen, the amount needed for complete wood combustion, may be used as the fluidizing/heating medium. Preferably, about 20% of stoichiometric air is supplied by blower 206 to fluidize the bed and react the wood chips. A start-up burner, not shown, is included for bringing the bed temperature up to the ignition temperature of the chips. The wood chips are rapidly heated in the bed and decompose/gasify. The bed is made deep enough to allow some of the char to burn as it circulates down into the lower part of the bed, to reduce the oxygen content and to supply the heat for maintaining the bed at its operating temperature. Preferably, the bed operates at from 525° to 700° C. and the residence time, defined by the average gas velocity from bed bottom 196 to gasifier exit 198, is 0.5 to 2.0 seconds. These conditions provide a large volume of biomass oil rich in alkyl-phenolics and aldehyde. The biomass oil may be from any lignin-bearing component; because of its availability and cost, wood and wood by-products are ideal lignin sources for producing the biomass oil.

By using a fluidized-bed gasifier as a reaction vessel, the operating temperature and residence time may be controlled as desired. For a fixed residence time and throughput established by the fluidizing gas flow from blower 206, the bed operating temperature is established by the wood feed rate. The control flexibility allows the process to be adapted for different feedstocks with varying composition and also for the creation of biomass oils with desired properties, such as chemical composition and viscosity.

The oil and gas along with small char particles are carried out of reactor 202 into separator 204, where the oil is separated from the gas and char. Separator 204 is shown in more detail in FIG. 2, in which fluidized-bed gasifier 202 is fed with dried wood chips at approximately 17.5% moisture content through dual feed ducts 203 and 205. Rotary pressure blower 206 supplies less than stoichiometric air for fluidizing the bed and partially combusting the wood chips and char product to maintain the bed temperature. The blower rate may be set as desired to provide the proper residence time. The wood chips decompose and gasify to form gas, vaporized oil and small char particles which are blown out of the top of gasifier 202. The larger char particles circulate through the bed and burn to supply heat and reduce fluidizing gas oxygen content. Entrained char is removed by primary, secondary and tertiary cyclones 212, 214, and 215, respectively. Cyclone 215 may be a multiple cyclone as shown.

Figure 2:
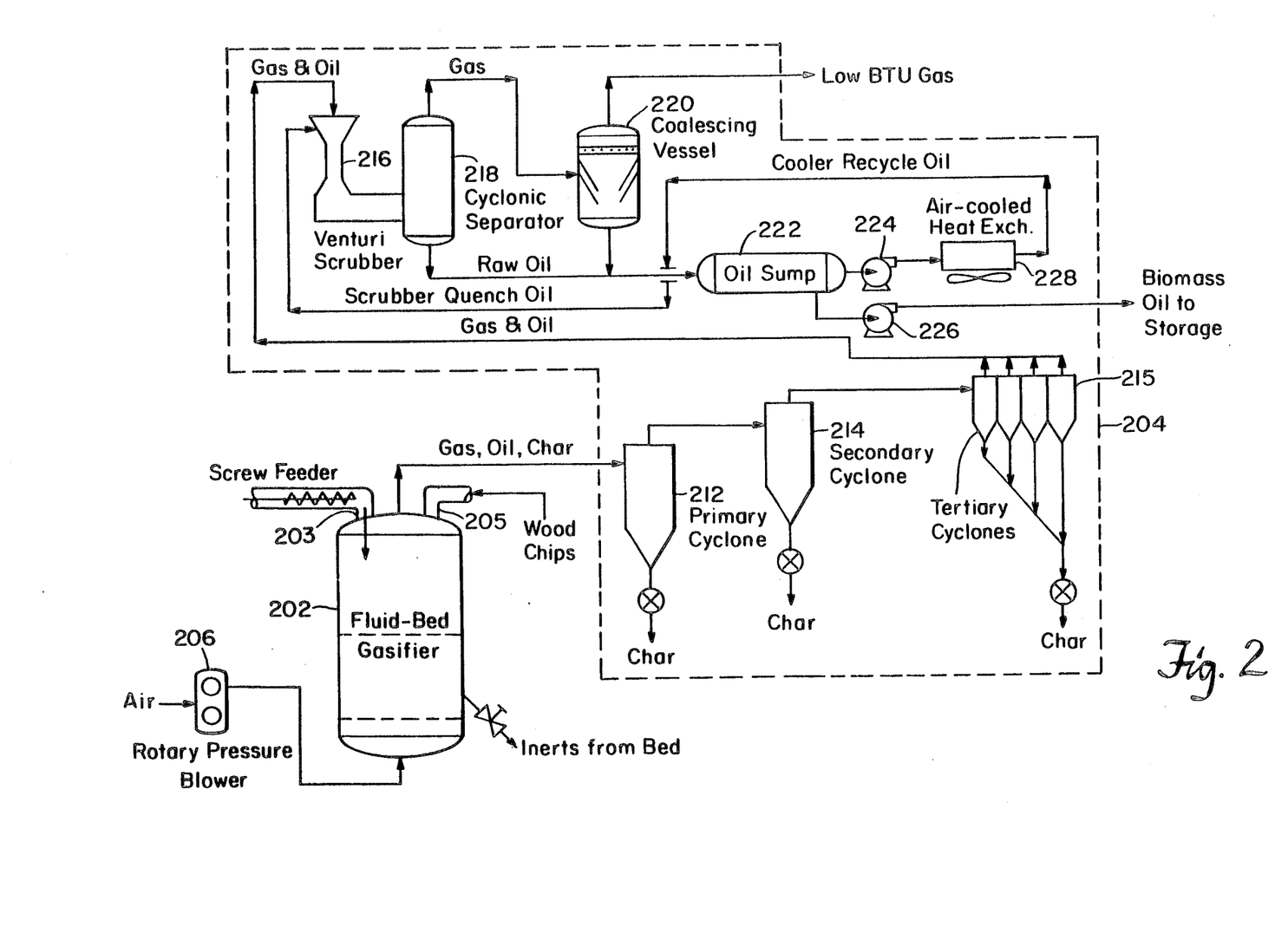
FIG. 2 is a detailed schematic diagram of the separator of FIG. 1.

The gas and oil from cyclone 215 are passed to venturi scrubber 216, usually operated above the water dew point. Scrubber 216 may employ water as the start-up scrubbing medium. The gas and condensed oil are separated in cyclonic separator 218. Additional oil mist removal is accomplished in low-velocity coalescing vessel 220. The condensed oil flows to sump 222, from which a recycle stream is pumped by pump 224 through heat exchanger 228 and sprayed back into scrubber 216 as the scrubbing medium. The net biomass oil product is pumped by pump 226 to a storage tank. The gas fraction heating value may be controlled by control of the operating temperature of gasifier 202, as well as the operating temperature of scrubber 216.

This method provides a polymerizable biomass oil product made entirely from a source of lignocellulosic material such as an agricultural waste or wood feedstock. Petroleum-derived phenol or phenolic fraction separation from biomass pyrolysis oils are avoided in this approach. As well, formaldehyde is not needed. Thus, this invention provides the means of making a low-cost petroleum formation permeability control medium from waste products and wood sources with an extremely simple process not requiring expensive, pure starting materials, and avoiding the need for formaldehyde.

Other methods of thermally decomposing the biomass to provide a biomass oil, pyrolysis and liquefaction, are known to those skilled in the art. For example, Russell et al., U.S. Pat. No. 4,508,866, incorporated herein by reference, describes a liquefaction process in which the liquefaction oil is separated into water soluble and insoluble fractions. Chum et al., U.S. Pat. No. 4,942,269, incorporated herein by reference, describes methods of making pyrolysis oils, followed by similar extraction steps. Preferably, when liquefaction and pyrolysis biomass oils are used as the formation permeability-altering agents in this invention, the water-insoluble fractions are employed to obviate problems with unwanted dispersal of the biomass oil in subterranean water.

Figure 3:
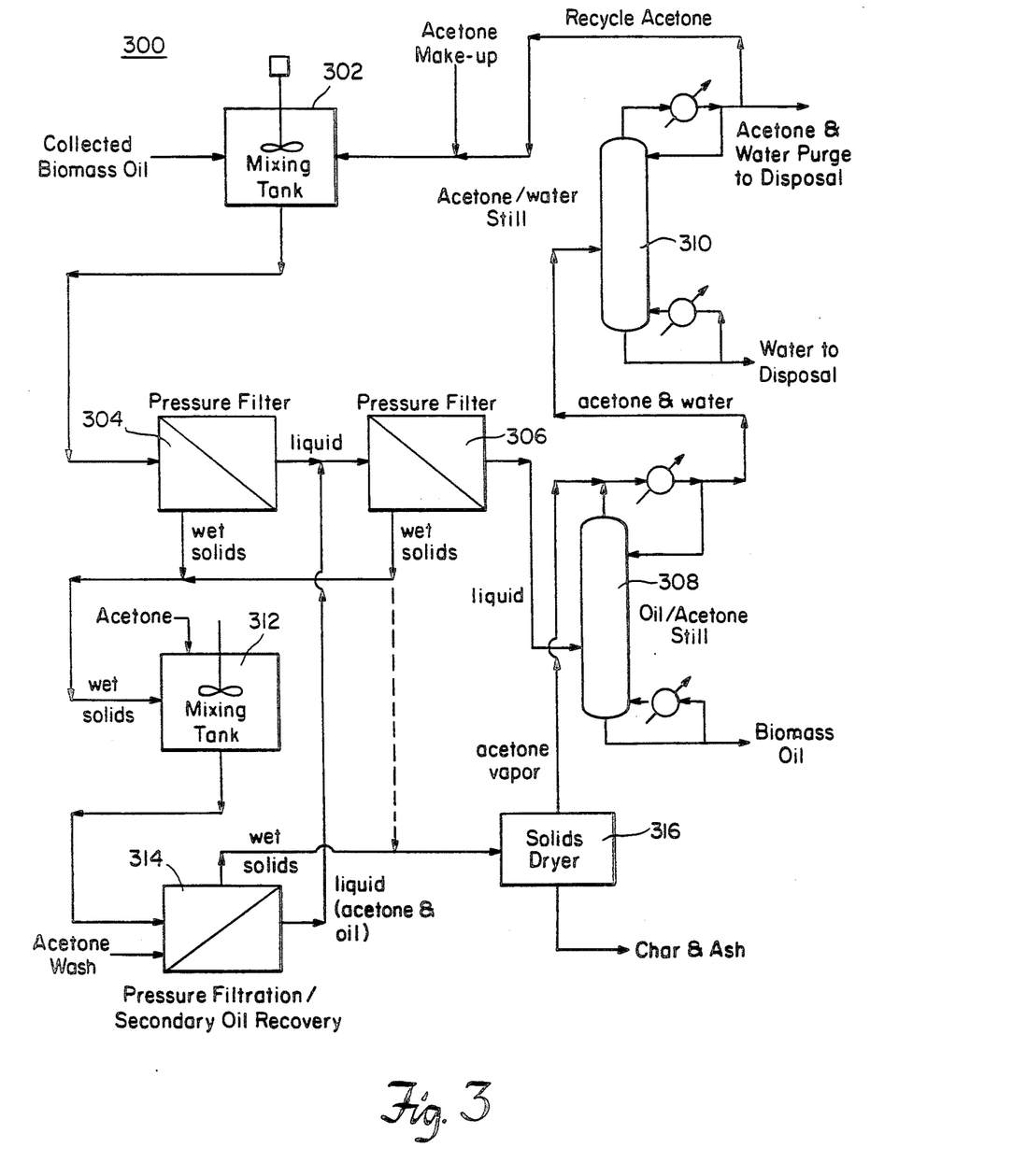
FIG. 3 is a schematic diagram of a biomass oil particulate-removal method according to this invention.

FIG. 3 depicts schematically a biomass oil particulate-removal process which may be employed to remove all but the finest particulates from the biomass oil produced as shown in FIG. 2. The biomass oil is filtered before injection to remove at least some particulates such as char and ash to prevent particulate blocking of the subterranean formation. Particulate removal system 300 includes mixing tank 302 for providing a homogeneous acetone-thinned biomass oil to first stage pressure filter 304, which may alternatively be a centrifuge. Acetone is added to tank 302 as a thinning solvent to decrease the viscosity of the biomass oil so that it may be effectively filtered. Other solvents may be used, such as other ketones and ethyl acetate. The liquid from this first stage of filtration may then be passed to second filtration stage 306, which may be a pressure filter or an ultrafiltration device. After such second filtration, in which typically solids of greater than one micron, or even 0.1 micron, are removed, the liquid fraction is passed to still 308 for separating the biomass oil from the acetone and water emulsified in the oil, which are separated in still 310 to recycle acetone back to mixing tank 302.

Secondary oil recovery is accomplished from the wet solids collected from first and second stage filters 304 and 306 by further diluting the solids with acetone in mixing tank 312, and then filtering the mixture with an acetone-wash pressure filter 314, which then supplies the liquid acetone and oil back to second stage filter 306. The wet solids are then dried in drier 316, and the liquid returned downstream of still 308. The apparatus of FIG. 3 is an example of an apparatus which may be used to remove particulates, primarily char and ash particles, of a desired size so that the maximum particle size of the biomass oil injected into the subterranean formation is compatible with the reservoir pore structure to prevent unwanted blocking.

The biomass oil production process and subsequent oil processing can be used to produce properties in the oil compatible with the formation to be blocked—composition, viscosity, density and pH. For example, the pH of the oil may be tailored for the reservoir by changing the feedstock and/or operating conditions (temperature and reaction residence time), or by adding some base to the biomass oil prior to injection. In either a sandstone or a carbonate reservoir, the oil will react relatively slowly with the alkali carbonate species present in the formation. Depending on the distance the oil is expected to travel and the amount of carbonate to which the injection front of the biomass oil will be exposed, the pH of the oil will thus increase, causing further polymerization of the oil and thus reducing the amount of caustic that will be needed to be injected to polymerize the oil. Preferably, the base used for polymerization has soluble salts to prevent clogging.

The viscosity of the biomass oil may also be tailored for the reservoir to minimize oil filling of the low permeability zones given the reservoir temperature, permeability, drive pressures, and volume of oil to be added. The oil viscosity can be controlled to some extent by the production operating temperature and residence time. To produce a more viscous oil, the biomass oil can be heated for a period of time to produce thermal polymerization, for example heating to 100° C. for 5 minutes. To produce less viscous oil, a thinning solvent such as a ketone or acetate can be added. Since the biomass oil is essentially water-insoluble, thinning with water requires that the water be emulsified into the oil by shear, either with or without a surfactant. Biomass oil density can be modified for vertical permeability control if desired during the production process, or with addition of a solvent or water. If a biomass oil density greater than that of water is required, production conditions may be tailored for such a result. For example, the entire fraction of a biomass oil produced by fluidized-bed partial oxidation of biomass tends to have a density greater than water.

Figure 4A:
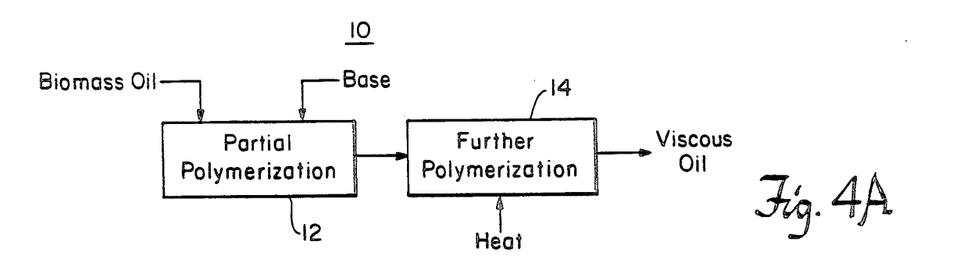
FIG. 4A is a schematic diagram of a method for producing a more viscous biomass oil for use in the method of this invention.

There is shown in FIG. 4A method 10 for increasing the viscosity of the biomass oil. The biomass oil and a base are mixed, step 12, to partially polymerize the oil. The partially polymerized oil may then be heated, step 14, to further polymerize the oil; preferably, the heating step takes place at less than the oil initial boiling point. The amount and type of base, and the time, conditions and temperature of the heating step may be altered dependent on the biomass oil composition and/or the desired final viscosity.

Figure 4B:
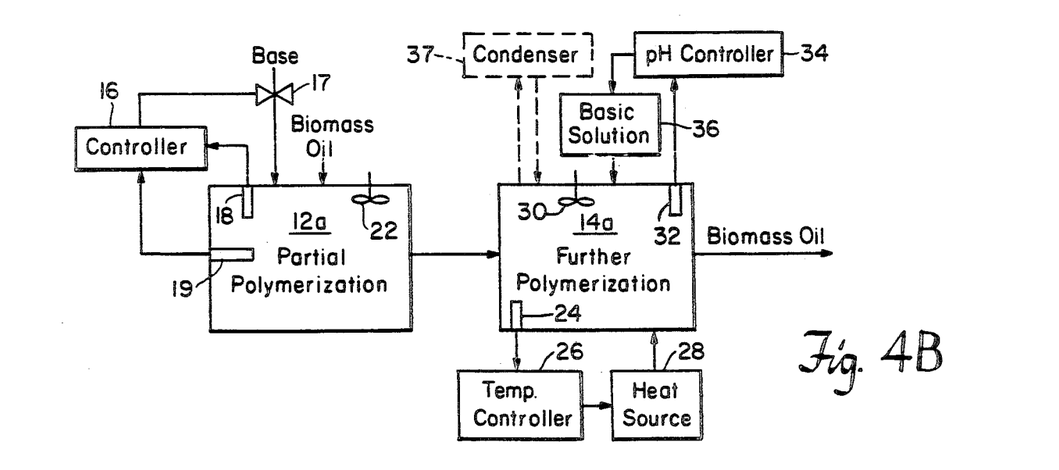
FIG. 4B is a detailed schematic diagram of an alternative technique for producing a viscous biomass oil for use in the method according to this invention.

An alternative technique according to this invention for altering the biomass oil viscosity is shown in FIG. 4B. The biomass oil and a base are mixed in container 12a to partially polymerize the oil. Preferably, a soluble salt base such as sodium hydroxide, potassium hydroxide or magnesium hydroxide is used so that subsequently formed salts will not precipitate in the subterranean formation, especially in the vicinity of a production well. Controller 16 is responsive to temperature monitor 19 and pH monitor 18 for regulating the base flow through valve 17. Controller 16 meters in the base to keep the temperature of the mixture at a desired level as the pH is raised to above 7.0 to ensure partial polymerization. Stirrer 22 ensures complete mixing.

The biomass oil may be produced by thermal decomposition of any lignocellulosic biomass material, including pure pyrolysis, liquefaction, or partial oxidation. Preferably, the biomass oil is produced by partial oxidation of lignocellulosic material to supply a self-polymerizable and cross-linking oil including the necessary phenolics and aldehydes. The oil so produced is acidic and only very slightly water-soluble. Examples of material from which the oil may be made are wood, rice hulls, corn cobs, and other agricultural waste products containing the lignin necessary for forming a polymerizable biomass oil. Virtually any basic substance may be used for raising the pH from typical values of approximately 3 to 4, to above 7.0 to achieve controlled polymerization in order to alter the biomass oil viscosity before injection. Metal hydroxides whose other salts are soluble are the preferred class of basic solutions used in raising the pH. As an example, a 50% sodium hydroxide solution may be mixed with the biomass oil in container 12a. The base is added to the oil gradually while stirring until the oil is made basic. Preferably, the pH is raised to at least 8.0 to encourage polymerization, although polymerization will occur at a pH of anywhere between 7 and 14. Above a pH of 9.0, further base addition is relatively ineffective.

Temperature rise from the acid/base and polymerization reactions should be limited by proper metering of the base and/or vessel cooling to keep the temperature of the mixture below the water boiling point to prevent a large water loss or a steam explosion, and maintain a set maximum temperature for quality control purposes. A temperature of from 35° to 125° C. is acceptable for most biomass oils.

After adjusting the pH, further polymerization, step 14a, may be realized by heating the partially polymerized biomass oil to a point below its initial boiling point. Preferably, the partially polymerized oil is heated to approximately 70° to 80° C. by heat source 28 controlled by temperature controller 26, which is responsive to temperature probe 24, which may be a thermocouple. As the solution tends to buffer, pH controller 34, responsive to pH sensor 32, may be included for controlling the addition of basic solution 36 to maintain the pH above 7.0 to ensure the continuation of the polymerization. Stirrer 30 is included for ensuring thorough mixing during the heating step.

Polymerization steps 12a and 14a may take place in a single vessel or in separate vessels. Preferably, step 14a takes place under total reflux, as shown by condenser 37 in phantom, for approximately one hour. The heating may then be stopped and the solution cooled to stop the polymerization. There is no need for addition of an acid to return the oil pH to neutral or acidic to stop the reaction. After step 14a, a sample of the product may be tested for viscosity and expected further in situ polymerization by further base or chemical addition and/or heating to approximate subterranean conditions.

Typically, the biomass oil having the desired pH, viscosity and density is injected into the injection well at a rate and pressure that places it into the higher permeability structure or the most swept regions of the reservoir. After the volume of oil has been injected, the well bore and the volume immediately surrounding the injection point would be cleared of oil by pushing an inert gas such as nitrogen or carbon dioxide into the well to avoid reaction with caustic subsequently added and plugging in the well bore and the immediate vicinity of the injection point.

If the reservoir alkalinity plus any base added before injection is not sufficient to allow the injected biomass oil to react sufficiently in situ, a polymerizing agent such as a caustic solution would be injected into the well. As the caustic solution comes in contact with the biomass oil, the oil polymerizes rapidly, creating a high viscosity shell or plug at the oil/caustic interface. The caustic solution following the contact front will tend to bypass the plugged zones, following the edges of the biomass oil zone to create a polymerized, high viscosity shell around the high permeability zones to which the biomass oil has been added. These shells may be either large or microscopic.

Since the polymerized biomass oil is soluble in water and basic solutions, the above process is reversible.

Two manners in which the polymerizable biomass oil may be used to alter the permeability of a subterranean formation are shown in FIGS. 5 and 6. FIG. 5A depicts one-quarter of an idealized horizontal cross-section of a homogeneous formation under water flood using a five spot pattern, with one of four injection wells 360 spaced from production well 62. Constant-pressure lines $P_1-P_4$ are shown radiating from the one of the four injection wells. Flow lines, normal to the constant pressure lines, are depicted as $F_1$, $F_2$ and $F_3$. As expected, the volumetric flow rate is inversely dependent on the length of the flow path. Accordingly, the water flood tends to flow directly between the two wells, sweeping the zone adjacent flow line $F_1$ and bypassing much of the oil in the zones adjacent to flow lines $F_2$ and $F_3$. FIG. 5B depicts flow in a nonhomogeneous horizontal cross section that has areas of high permeability indicated by flow lines $F_4$ and $F_5$. FIG. 5C depicts a hypothetical biomass oil location 364 in the scenario of FIG. 5B after the oil is injected into injection well 360; a finger of oil has been swept toward the production well. FIG. 5D depicts altered water flow stream lines 368 after a biomass oil polymerizing agent such as sodium hydroxide is injected into well 360 following the biomass oil to create shell 366 of further polymerized biomass oil which effectively plugs the pores to alter the flow path. FIG. 5E depicts a hypothetical situation at some time after the time of FIG. 5D in which the polymerizing agent has further migrated to create separate areas 364a and 364b of biomass oil fully or partially surrounded by shells 366a and 366b, respectively, of polymerized oil to alter the flow paths as shown. Because the polymerized oil is water soluble and even more soluble in a basic solution, the outer polymerized shell such as shell 366, FIG. 5D, may be altered or removed by further injection of water or a dilute basic solution. Accordingly, an area which has been plugged may be opened to alter the flow paths in a desired manner so that the entire blocking process is made reversible.

Figure 5A:
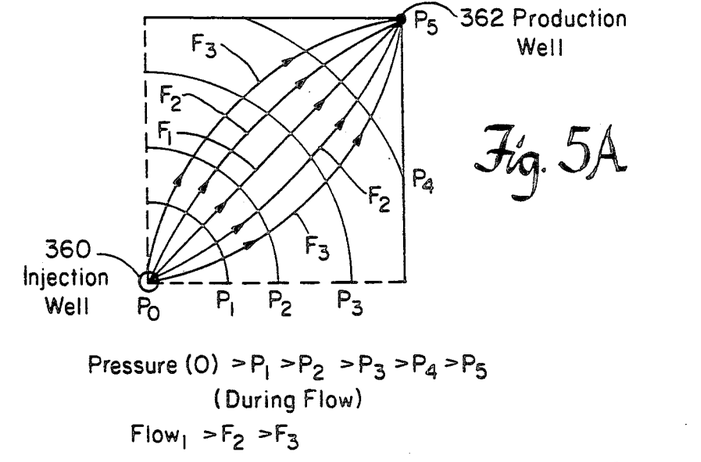
Figure 5B:
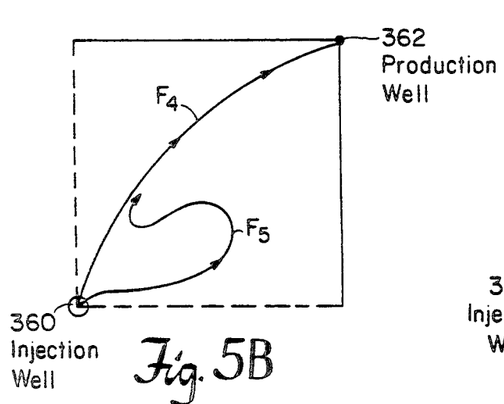
Figure 5C:
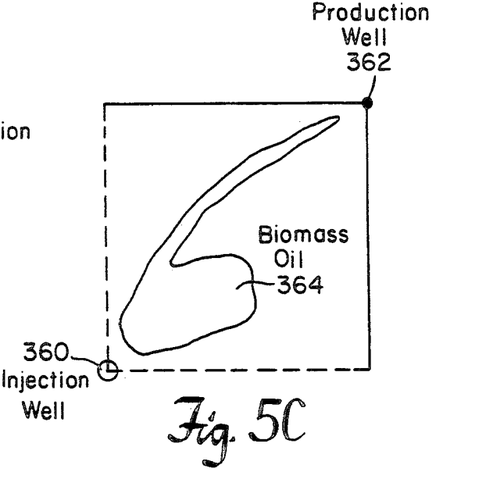
Figure 5D:
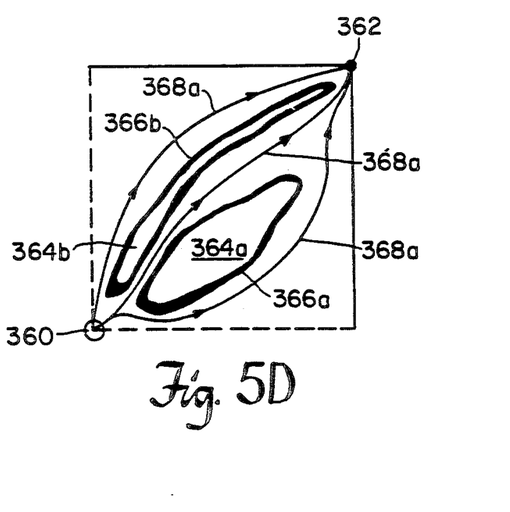
Figure 6A:
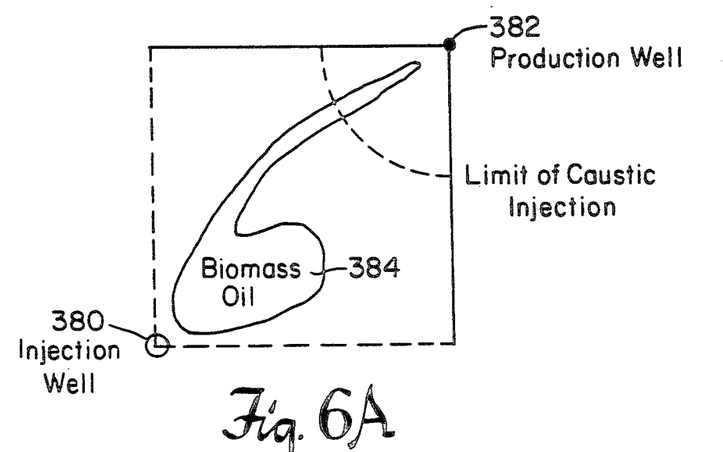
FIGS. 6A, 6B and 6C illustrate permeability control according to this invention using both an injection well and production well as points of introduction.
Figure 6B:
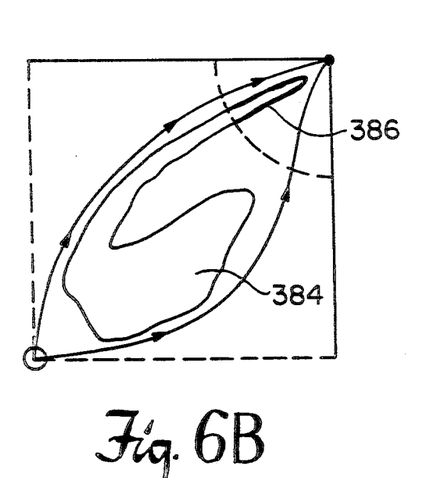
Figure 6C:
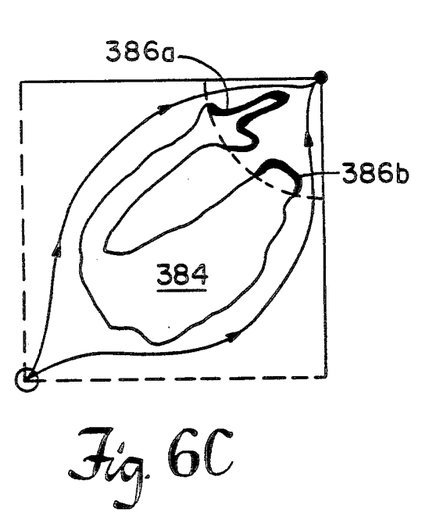

Another use of the biomass oil and polymerizing agent is depicted in FIGS. 6A through 6C using the scenario of FIG. 5B. In this example, the biomass oil is injected through injection well 380 and the polymerizing agent (sodium hydroxide) is injected through production well 382. Oil injection is depicted in FIG. 6A. Polymerized shell 386 depicted in FIG. 6B is created at some time after caustic injection. FIG. 6C, which is later in time than FIG. 6B, illustrates that as the water flow pushes oil 384 before it into the zone containing the caustic polymerizing agent, the biomass oil will continue to polymerize as it reaches the caustic to further alter the permeability; FIG. 6C depicts two separate areas 386a and 386b of further polymerized biomass oil, effectively blocking the previously-swept central flow paths.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method for controlling the permeability of a petroleum-bearing subterranean formation, comprising:
    producing viscous biomass oil by thermal decomposition of lignocellulosic material; and
    injecting at least a fraction of said biomass oil into the petroleum-bearing formation to decrease the permeability of at least some of said formation for altering flow paths through the formation to increase petroleum yield from the formation.

2. The method of claim 1 in which the step of producing biomass oil includes partially oxidizing the lignocellulosic material to produce an alkyl-phenolic and aldehyde rich oil.

3. The method of claim 1 in which the thermal decomposition process is taken from the group including pyrolysis and liquefaction.

4. The method of claim 3 in which the step of producing biomass oil includes separating said biomass oil into a plurality of fractions to produce a viscous, water-insoluble biomass oil fraction for injection.

5. The method of claim 1 in which said biomass oil is water-insoluble.

6. The method of claim 1 further including the step of filtering said biomass oil before injection to remove at least some oil particulates to prevent particulate blocking of the subterranean formation.

7. The method of claim 1 further including the step of introducing into the formation after said biomass oil a biomass oil polymerizing agent to increase the biomass oil viscosity for more effectively decreasing the formation permeability.

8. The method of claim 7 in which said polymerizing agent includes a monovalent metal hydroxide.

9. The method of claim 8 in which said polymerizing agent includes sodium hydroxide.

10. The method of claim 7 in which said polymerizing agent includes a divalent metal hydroxide.

11. The method of claim 10 in which said polymerizing agent includes calcium hydroxide.

12. The method of claim 7 further including the step of at least partially removing said injected, polymerized oil to increase the permeability of at least part of the subterranean formation.

13. The method of claim 12 in which the step of at least partially removing polymerized oil includes introducing into the formation a basic solution to at least partially dissolve the polymerized oil.

14. The method of claim 12 in which the step of at least partially removing polymerized oil includes introducing water into the formation to at least partially dissolve the polymerized oil.

15. The method of claim 2 in which the step of partially oxidizing the lignocellulosic material includes reacting the material in a fluidized-bed reactor with less than stoichiometric oxygen to partially burn the material for producing at least some of the heat for thermal decomposition of the lignocellulosic material for oil production.

16. The method of claim 1 further including the step of altering the biomass oil viscosity before injection for more closely controlling the formation permeability.

17. The method of claim 16 in which the step altering the viscosity includes increasing the biomass oil pH before injection to partially polymerize the oil for increasing the biomass oil viscosity.

18. The method of claim 17 in which increasing the biomass oil pH includes adding to said oil a basic substance whose salts are generally soluble.

19. The method of claim 18 in which said basic substance is taken from the group including sodium hydroxide, potassium hydroxide and magnesium hydroxide.

20. The method of claim 16 in which altering the biomass oil viscosity includes heating the oil before injection to partially polymerize the oil for increasing the oil viscosity.

21. The method of claim 16 in which altering the biomass oil viscosity includes thinning the oil to decrease viscosity.

22. The method of claim 21 in which thinning the oil includes adding a thinning substance.

23. The method of claim 22 in which said thinning substance is taken from the group including ketones, acetates and water.

24. The method of claim 1 in which the step of injecting biomass oil includes injecting said oil into a water-sweep injection well to alter the sweep water flow paths.

25. The method of claim 24 further including the step of introducing into the formation after said biomass oil a biomass oil polymerizing agent to increase the biomass oil viscosity for more effectively decreasing the formation permeability.

26. The method of claim 25 in which said polymerizing agent is introduced into the injection well.

27. The method of claim 25 in which said polymerizing agent is introduced into a production well.

28. A method for controlling the permeability of a petroleum-bearing subterranean formation, comprising:

partially oxidizing a biomass feedstock with less than stoichiometric oxygen to produce an alkyl-phenolic-rich viscous biomass oil;

filtering said oil to remove at least some oil particulates;

injecting said filtered biomass oil into the petroleum-bearing formation to decrease the permeability of at least some of the formation; and introducing into the formation a biomass oil polymerizing agent to increase the biomass oil viscosity for altering flow paths through the formation to increase petroleum yield.

* * * * *